Jan. 25, 1944. J. C. CARLIN 2,340,040
BIAS-CUT FABRIC ASSEMBLY FOR TIRE MANUFACTURE
Original Filed Nov. 19, 1940
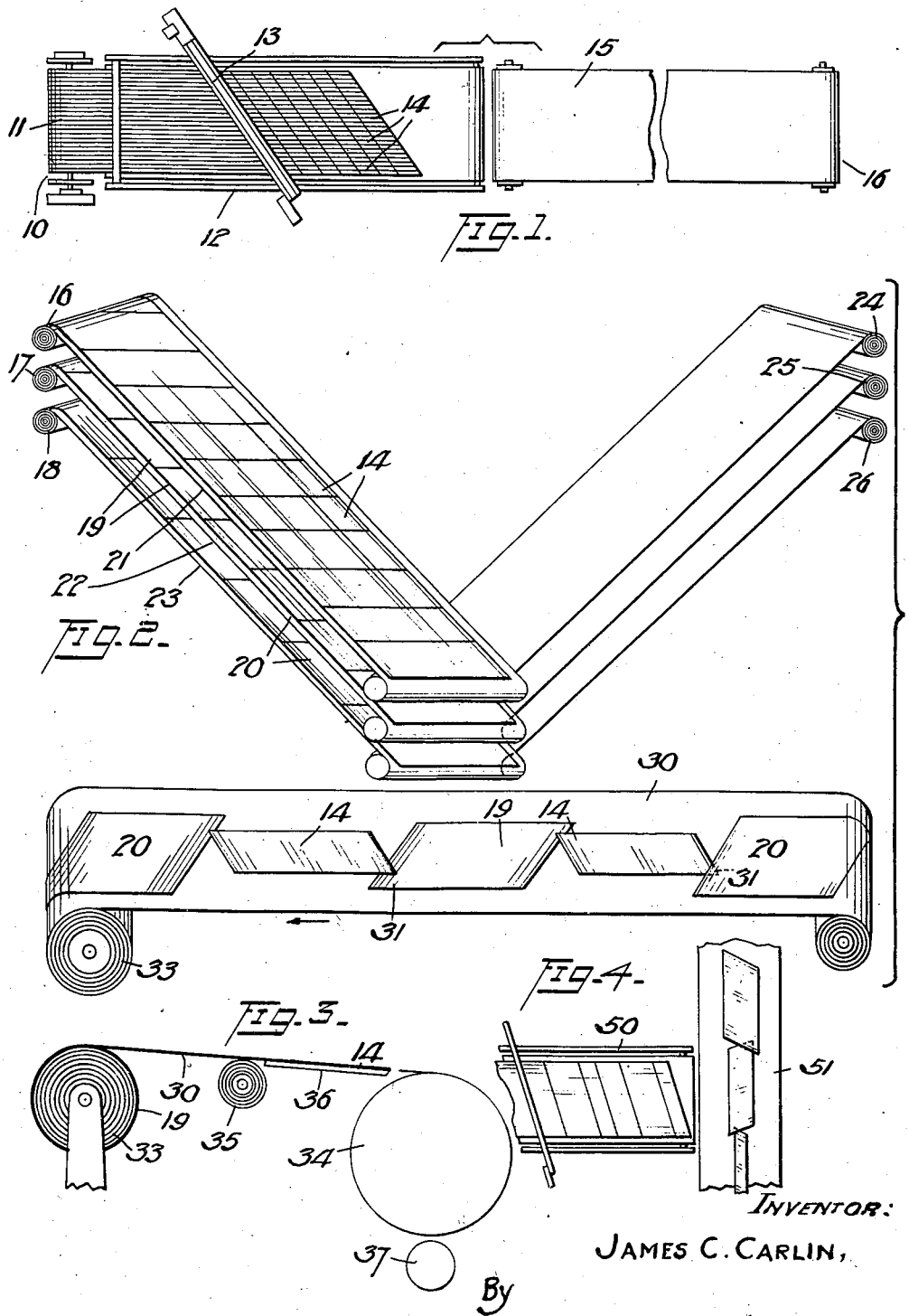
INVENTOR:
JAMES C. CARLIN,
By
ATTORNEY.

Patented Jan. 25, 1944

2,340,040

UNITED STATES PATENT OFFICE 2,340,040

BIAS-CUT FABRIC ASSEMBLY FOR TIRE MANUFACTURE

James C. Carlin, Norristown, Pa., assignor to Lee Rubber & Tire Corporation, Conshohocken, Pa., a corporation of New York Original application November 19, 1940, Serial No. 366,216. Divided and this application May 23, 1941, Serial No. 394,760

3 Claims. (Cl. 206—59)

This application is a division of my copending application, Serial No. 366,216, filed November 19, 1940.

The present invention relates generally to tire manufacture and is more particularly directed to that phase of tire manufacture which includes the building of the tire carcass consisting largely of several plies of rubber impregnated fabric which is referred to herein as ply fabric, tire fabric, or tire cord fabric. Such fabric is produced by a calender, which impregnates the fabric, such as corded fabric, with the requisite amount of rubber. This fabric is thereafter bias cut and the bias cut strips are thereafter fed to the tire building drum where such strips are compacted and otherwise treated in the formation of the tire carcass. This laminated cord fabric structure is immediately thereafter covered with the tire tread to complete the tire carcass. The tire building drum has associated therewith devices such as stitching rolls which operate upon the strips of cord fabric as they are applied to the tire building drum and these stitching rolls also operate upon the tread after the same is applied to the drum. Other operations are also performed upon the fabric and tread while they are on the collapsible tire building drum.

In the building of such tires or tire carcasses it is customary practice to make the cord plies of such length that when they are placed around the drum the ends thereof overlap slightly. By reason of the increased diameter of the surface of the drum as the plies are applied thereto the successive plies have to be longer than the preceding plies. Moreover, the several plies of cord fabric employed in the building of a tire are not always of the same width for the reason that the longitudinal marginal portions of the plies are turned over the bead units to overlie and envelop the latter to retain them in place, the several plies employed in the construction of a single tire carcass being turned inwardly to varying extents in order to insure that the inturned edges of the several plies are not so coincident as to form a pronounced shoulder or ledge within the tire side wall.

In the factory, the manufacturer of the fabric is essentially a continuous process, whereas the tire building process is discontinuous and relatively slow as compared with the rate of manufacture of the cord fabric. Moreover, one calender is capable of supplying fabric at a rate adequate for the needs of a large number of tire building drums. For these and for other reasons, the temporary storing and transportation of the cord fabric to the tire building drums constitutes a problem which prior to the present invention has been inadequately met in that the means provided therefor were costly, clumsy, consumed an excessive amount of factory space, and also consumed an excessive amount of time and labor in their manipulation. It is therefore the aim of the present invention to obviate these difficulties by the provision of an assembly in which the bias cut fabric strips of the necessary different widths may be stored for subsequent use with a minimum consumption of time and labor and also in a minimum space.

In the prior practice, the feeding of bias cut cord strips to the tire building drum was largely, if not entirely, a manual operation which considerably reduced the effectiveness of the tire building drum and generally slowed the tire building process. It is therefore one of the objects of the present invention to provide an assembly of the strips of such character as to facilitate the more or less automatic feeding of the tire strips to the drum.

More comprehensively stated, it is the aim of the present invention to provide a means for the treatment and storing of cord fabric in such manner and form that it may be substantially automatically fed to a tire building drum and thereby reduce the manual operations at the building drum to a minimum with a consequent increase in the efficiency of the tire building drum and also with a consequent improvement in the quality of the tire.

In order to accomplish the foregoing ends, the present process provides for winding up a multiplicity of bias cut strips of cord fabric in the form of rolls by means of a carrier fabric; the strips being disposed on the carrier fabric in end-to-end fashion. This roll is subsequently employed for feeding the strips to the tire building drum. The strips are disposed on this carrier fabric in the correct order and manner in which they are to be fed to the tire building drum. Thus, for this purpose the bias cut strips are disposed with their longitudinal edges parallel to the edges of the carrier web and preferably with the adjacent bias cut ends of two adjacent strips disposed angularly to each other. In addition, the longitudinal center lines of the strips are all in alinement so as to provide for the accurate feeding of the cord strips to the drum. The strips are disposed on this carrier web in groups, each group comprising the number of strips employed in the building of the tire carcass, each of the strips in each group being properly dimensioned, that is, being of the proper length and width for its particular position on the drum. The arrangement of such groups and strips within each group is such that when the roll is unwound the strips are fed to the tire building drum in their proper order and in proper position and relation with respect to each other.

The following specification together with the accompanying drawing constitute a more detailed description of the present invention.

In the drawing:

Figure 1 is a diagrammatic illustration of the bias cutting operation;

Figure 2 is a diagrammatic illustration of the assembly of the strips onto the feeding rolls;

Figure 3 is a diagrammatic illustration of the feeding of the strips onto the tire building drum; and Figure 4 illustrates a modification of the process.

The first step in the building of the tire core consists in the manufacture of the cord fabric in the form of an endless web. This is accomplished on a calendering machine and the endless web of cord fabric produced by the calendering machine may be bias cut as it leaves such machine or it may first be wound into a roll and be bias cut subsequently. Either of these methods of handling or treating the fabric may be employed in the present invention.

In Figure 1 reference character 10 may therefore be said to designate the calendering machine with the cord fabric 11 produced thereby passing out of the machine, or the reference character 10 may designate a roll of previously produced cord fabric which is being unwound and fed to the bias cutting machine 12. Such bias cutting machines are common in the art and need not be specifically described herein. The cutter 13 operates periodically to cut the fabric 11 into strips 14. As shown in Figure 1, such strips 14 are of equal width. In a modification of the present process, which will be described in a later portion of this specification, the width of the strips 14 is varied in accordance with the needs of the tire which is to be produced. In the form of the invention at present being described, however, such strips 14 are of equal width. The strips 14 still adhere to each other because the rubber is still in a tacky condition and the strips therefore still approximate to a degree the condition of continuous web of fabric. The strips in this condition are received by a carrier web 15 which moves at the same rate or in step with the movement of the fabric 11. The carrier web 15 together with the strips 14 is rolled into a roll 16.

The bias cutting machine 12 may be operated so as to cut the bias strips of any desired width by varying the rate of travel of the web 11 or by varying the period of operation of the cutter 13. For the purpose of the present invention, several rolls 16, 17 and 18 are produced, each comprising a carrier web 15 and a multiplicity of strips of cord fabric 14 carried thereby, the width of the strips, however, in each roll differing from the width of the strips in the other rolls. The number of such widths may differ, depending upon the specific construction of the tire and the specific method of its manufacture; it is found, however, that the more common practice involves the use of three widths of strips.

The next step in the present process involves the formation of a feed roll of such strips. For this purpose three rolls such as 16, 17 and 18 shown in Figure 2 of the drawing are unrolled in a manner which permits the manual removal of a strip at a time from each of the webs in suitable order and depositing each strip on the travelling web 30. For this purpose it is preferred to unwind the rolls 16, 17 and 18 in a stepwise manner and independently each of the other.

For the purposes of illustration, we may assume that the tire we are seeking to manufacture contains a four-ply carcass and that such carcass comprises two strips of the same width, a third strip of another width and a fourth strip of still another width. In order that in the subsequent feeding of the strips to the tire building machine such strips should be fed in the proper order when the feeding roll is unwound, the strips in each group have to be deposited on the carrier web 30 in the reverse order from that in which they are to be fed to the tire building drum. In the diagrammatic showing of Figure 2, roll 16 carries strips 14 of the first width, roll 17 carries strips 19 of the second width and roll 18 carries strips 20 of the third width. Thus, a group of four strips consisting of two strips 14, one strip 19 and one strip 20 are needed for each tire core.

Each strip after it is removed from the roll 16, 17 or 18 and before it is deposited on the carrier web 30 is first adjusted to its proper length. The fabric of which these strips are made is easily severed by a simple manual operation. The operator therefore merely measures the desired length of each strip and removes any excess of the strip at one end thereof. He then deposits the strip on the travelling web 30 and deposits each successive strip after it has been measured and cut for length, taking care that the longitudinal center lines of the strips are in alinement. In order that the feeding of these strips to the tire building drum should be facilitated, the adjacent strips are deposited on the carrier web 30 in the manner shown with the ends thereof disposed angularly to each other and providing a slight overlap at the corners as shown at 31. This overlap greatly facilitates the feeding of each group of strips to the tire building drum. The carrier web 30 together with the multiplicity of groups of strips is wound to form a feed roll 33.

Turning back to the unwinding of the rolls 16, 17 and 18, it will be observed that the carrier fabrics 21, 22 and 23 of such rolls are rewound into empty rolls 24, 25 and 26. The fabrics 21, 22 and 23 are made to travel in a direction at an angle to the direction of travel of the strips 14, 19 and 20.

Figure 3 illustrates the tire building step employing the feed roll 33 and feeding the fabric strips to the building drum 34. In this operation, the feed roll 33 is unwound, carrier web 30 is wound onto roll 35 while the strips of tire fabric travel on guide 36 and onto the tire building drum 34. The overlapping portions shown at 31 serve to draw the strips successively onto the guide 36 and to deliver the same to the tire building drum 34. At the same time the overlapping is so small that it does not interfere with the manual separation of the strips in order to permit the stitching rolls 37 to operate upon each of the strips successively while the feeding of the other strips is interrupted.

It will now be understood that by means of the present invention and by means of the process thus far described, any desired number of rolls of strips of different widths may be stored until it becomes necessary to build tires of a known design. At such time the rolls, such as rolls 16, 17 and 18, are unwound and their strips distributed to form feeding rolls which again may be stored and made available for subsequent use in the building of tires on the tire drum. Aside from the fact that such rolls may be stored in the minimum of space and that the same can be transported in the plant with great facility, the actual tire building operation on the tire building drum is greatly facilitated by the automatic feeding of the strips to the drum and is further facilitated by the elimination of strip books and racks which, prior to this invention had occupied considerable space immediately adjacent the tire building drum and had necessitated much time and labor in their manipulation during the tire building operation.

Under some conditions, the said roll 33 with the proper distribution of the four strips thereon may be obtained directly from the cutting machine 50 shown in Figure 4. For this purpose the cutting machine would be operated so as to cut strips of variable width from the same web of fabric 11. For example, in the present case the cutter would operate to cut first two strips of the same width, then a strip of another width and then a strip of a third width and this series of operations would repeat itself so as to provide a bias cut web in which the strips fall in groups of four, each group comprising the proper arrangement of strips of the desired width for the tire which is about to be built. The traveling web 51 would be disposed adjacent to the delivery end of the cutting machine and the strips would be removed one at a time, adjusted to length, and deposited on the carrier web 51 so as to form the feed roll 33 shown in Figure 2.

As is shown in Figure 1, the cord fabric is conventionally made with the rubber impregnated cords thereof extending in parallelism, these cords being cut through at a bias to form the separate strips 14 each made up of parallel cords impregnated with and held together with rubber. Also, as is well known in the art, it is the conventional practice in forming the tire carcass that the several cord fabric strips or plies thereof are arranged in superposed relation to form a laminated foundation structure or core of the requisite thickness, each strip or ply being so disposed that the cords thereof extend at a bias or angularly across the tire carcass body. Moreover, in accordance with conventional practice, the several plies or strips are relatively so arranged that cords of one ply extend angularly with respect to the cords of the next adjoining ply, in view of which the several plies or strips which make up a single series thereof, such as the plies 14—14—19—20 of Figure 2, are relatively so arranged that the cords of a given ply extend angularly with respect to those of the next succeeding ply in the series.

In view of the fact that cords are held together simply by the impregnating rubber, it becomes a simple matter to adjust each ply to required length merely by the expedient of severing the ply fabric at any point in the length thereof through separation of the cords at that point.

What is claimed as new and useful is:

1. A roll of carrier web and bias cut strips of tire fabric carried by said web between the convolutions of the roll, the strips forming a series of groups, each group comprising the requisite number of suitably dimensioned strips for the formation of a tire core and being disposed lengthwise of the web with their longitudinal center lines in substantial alinement, the end corners of adjacent strips being disposed in overlapping relation.

2. As an article of manufacture, an assembly of bias cut fabrics for use in the manufacture of laminated tire casings comprising a roll of carrier web fabric and bias cut strips disposed between the convolutions of said roll, the strips being arranged in a series of groups, each group comprising the requisite number of suitably dimensioned strips for the formation of the laminated cord fabric carcass of a tire, the strips in each group being disposed lengthwise of the web with their longitudinal center lines in substantial alinement, the several strips of each group thereof being relatively so arranged that the cords of a given strip extend angularly with respect to the cords of a next succeeding strip, the end corners of adjacent strips in each group thereof being disposed in overlapping relation.

3. An assembly of bias cut strips of tire fabric for use in the manufacture of laminated cord fabric tires consisting of a roll of supporting fabric between the convolutions of which are disposed the said cord fabric strips, each strip being bias cut with the cords thereof extending angularly with respect to the longitudinal center line of the supporting fabric, the strips being arranged in a series of groups, each group comprising the requisite number of suitably dimensioned strips for the formation of a laminated tire carcass, the strips being each disposed lengthwise of the web with their longitudinal center lines in substantial alinement, the several strips being relatively so arranged that the cords of a given strip extend reversely with respect to the cords of a next succeeding strip, the ends of adjacent strips being connected together so that each strip serves as a leader for its succeeding strip to facilitate stripping the strips successively from the roll.

JAMES C. CARLIN.